United States Patent
Ding et al.

(10) Patent No.: US 12,184,497 B2
(45) Date of Patent: Dec. 31, 2024

(54) ORDERING POSSIBLE DEVICE LOCATIONS ON THE NETWORK BY PORT-OF-ENTRY LIKELIHOOD

(71) Applicant: Arista Networks, Inc., Santa Clara, CA (US)

(72) Inventors: Charles Ding, Santa Clara, CA (US); Ryan Sherali Madsen, San Francisco, CA (US)

(73) Assignee: ARISTA NETWORKS, INC, Santa Clara, CA (US)

( * ) Notice: Subject to any disclaimer, the term of this patent is extended or adjusted under 35 U.S.C. 154(b) by 318 days.

(21) Appl. No.: 17/558,815

(22) Filed: Dec. 22, 2021

(65) Prior Publication Data
US 2022/0345370 A1    Oct. 27, 2022

Related U.S. Application Data

(60) Provisional application No. 63/178,890, filed on Apr. 23, 2021.

(51) Int. Cl.
*H04W 56/00* (2009.01)
*H04L 41/12* (2022.01)

(52) U.S. Cl.
CPC .................. *H04L 41/12* (2013.01)

(58) Field of Classification Search
CPC ....................................... H04L 41/12
USPC ........................................ 370/218
See application file for complete search history.

(56) References Cited

U.S. PATENT DOCUMENTS

| | | | |
|---|---|---|---|
| 2011/0159862 A1* | 6/2011 | Jackson | H04W 4/029 455/418 |
| 2020/0221262 A1* | 7/2020 | Lepp | H04L 12/189 |
| 2020/0387219 A1* | 12/2020 | Chappell | G06V 10/96 |
| 2021/0067547 A1* | 3/2021 | Hale | H04L 63/102 |
| 2022/0329625 A1* | 10/2022 | Ballew | H04L 63/1483 |

OTHER PUBLICATIONS

"Nakagawa, Image Forming Device, Image Forming System, and Program, Aug. 6, 2009, JP 2009172914" (Year: 2008).*
Tang, A Data Transmission Method, Mobile Terminal And Server, May 31, 2017, CN 10672545 (Year: 2017).*

* cited by examiner

*Primary Examiner* — Sai Ming Chan
(74) *Attorney, Agent, or Firm* — Sprinkle IP Law Group

(57) ABSTRACT

A method of managing a network includes: obtaining a search request for a device of a plurality of devices of the network where the device is specified by a piece of network information associated with the device; searching a searchable data structure using the piece of the network information to obtain a search result where the search result comprises a location list of potential locations within the network where the device may be located; obtaining likelihood rankings of the potential locations; and providing a response to the search request using the search result and the likelihood rankings.

20 Claims, 9 Drawing Sheets

Results for: 02:0f:02:79:fa:d4

Network Location

Endpoint: 02:0f:02:79:fa:d4

Device Status  MAC Address
✓ Active       02:0f:02:79:fa:d4

Connected to berlin via Port-Channel304  [Somewhat Likely]

Device Status:         ✓ Active
Interface Description: bs301.box0
VLAN ID(s):            2000
MAC Type:              PEER_DYNAMIC
LLDP Neighbors:        -

The port Port-Channel304 on berlin is not sending any LLDP updates that can show whether or not it is physically connected to the endpoint 02:0f:02:79:fa:d4. This device learned:

- 02:0f:02:79:fa:d4 via the MAC Table

FIG. 3C

Results for: 10.90.165.1

25 days ago
cvp-sp-16 on port Management1
25 days ago
cvp-if-21 on port Management1
25 days ago
cvp-if-23 on port Management1
25 days ago
cvp-if-22 on port Management1
21 days ago
cvp-sp-15 on port Management1
6 hours ago
sw-10.90.165.32 on port Management1
sw-10.90.165.31 on port Management1

FIG. 3D

ORDERING POSSIBLE DEVICE LOCATIONS ON THE NETWORK BY PORT-OF-ENTRY LIKELIHOOD

CROSS-REFERENCE TO RELATED APPLICATIONS

This application claims priority from U.S. Application No. 63/178,890, filed Apr. 23, 2021, the entire contents of which are incorporated herein.

BACKGROUND

A network may enable devices to communicate with one another. The network may include devices that relay information (e.g., data packets) from a sending device to a destination device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIGS. 3A-3D shows an example in accordance with one or more embodiments described herein.

DETAILED DESCRIPTION

Figure 1A:
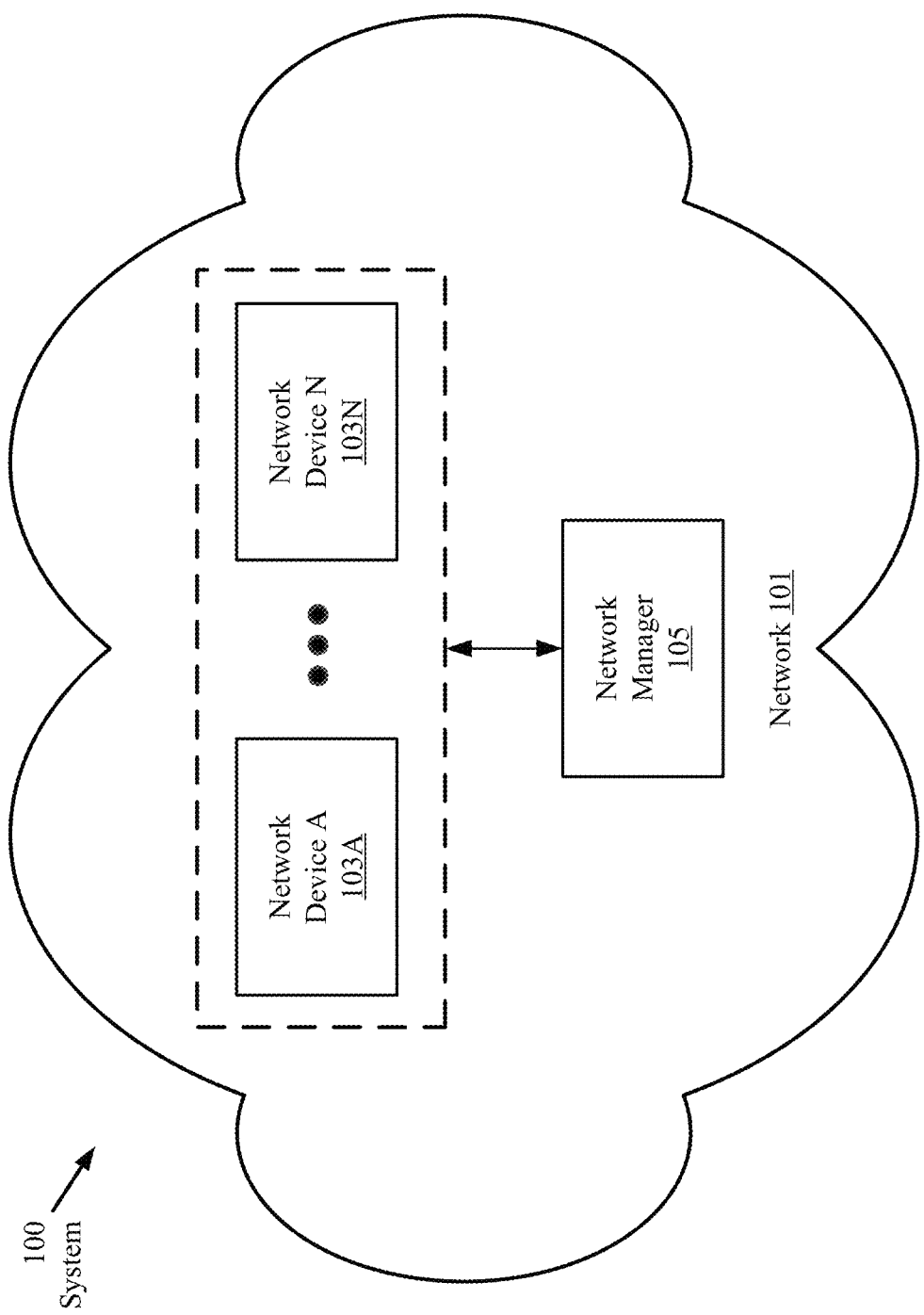
FIG. 1A shows a system in accordance with one or more embodiments described herein.

Specific embodiments will now be described with reference to the accompanying figures.

In general, embodiments disclosed herein relate to methods and systems for managing networks. A network may be a collection of devices (e.g., infrastructure device, core network device, endpoint, etc.) (also referred to herein as "network devices") that operate in a predetermined manner to enable communications to be delivered to any number of devices within the network and/or external to the network.

A network may include, for example, switches, multilayer switches, routers, services, and/or any number and type of other computing devices. These devices may communicate with one another using any combination of wired and/or wireless connections. Not all of these devices may be directly connected to one another. Consequently, communications may need to be relayed or otherwise disseminated through the network.

To manage the network, the devices in the network may obtain information (also referred to herein as "network information") regarding the network environment in which they reside. This information may be stored in tables (also referred to herein as "network information management tables") maintained by respective devices. When a network is formed using these devices, the location of each device within the network may not be known. However, various devices may, in the obtained information regarding the network environment, have information that may be usable to deduce the location of a particular device within the network environment.

The embodiments disclosed herein may provide systems, devices, and methods for obtaining information regarding the topology of a network. To obtain the network information, the various portions of information, maintained by any number of devices, regarding the network environment may be aggregated. Once aggregated, searches for desired information (e.g., lists of devices all having seen a particular internet protocol associated with a device) may be performed.

However, the information returned from a query may not explicitly specify (i) the location of a device within the network environment or (ii) the relevancy of each piece of returned information with respect to the location of the device within the network environment. Further, the returned information may indicate that the device may be located at multiple locations within the network environment. To improve the usability of the information, each piece of information may be ranked with respect to the likelihood that it is usable to identify the location of a device within the network topology. The ranking may be provided along with the underlying information to better enable administrators, application, and other entities to utilize the information.

In one or more embodiments, a search for an internet protocol (IP) address can quickly return all address resolution protocol (ARP) or neighbor discovery protocol (NDP or neighbors) entries containing that address, which include the IP to media access control (MAC) address translations and the timestamp in which the entry was created. A search for a MAC address will return all ARP, neighbors, and forwarding table entries containing that address. Since a single MAC address may be assigned to different IP addresses over time, one or more embodiments herein provide the history of a MAC address. In summary, the address search feature may query the ARP, neighbors, and forwarding tables of all onboarded devices on the network for a specific MAC address or IP address and returns back all port locations.

In one or more embodiments, the user searches a MAC address, IP address, or hostname of any device on the network, internal or external. Then, all possible locations for that device are found based on the ARP, neighbors, and forwarding tables of all onboarded devices on the network. Each possible location may be assigned a likelihood, based on the device's link layer discovery protocol (LLDP) neighbor devices (also referred to herein as "LLDP neighbors"). In one or more embodiments, the four levels of likelihood (also referred to herein as categories of likelihood) may be, but are not limited to: very likely, likely, somewhat likely, and less likely. Each location is also assigned an explanation for its likelihood. The heuristic for determining likelihood is different for onboarded/inventory devices (e.g., infrastructure devices) and endpoints. In the case where two ports have the same likelihood level, then the port with the earlier timestamp on which the port learned the MAC or IP address is placed ahead in the ordering of all ports. This happens because when a MAC or IP address is propagated across the network, the port that learns the address earlier is closer to the original device containing the address. All port locations are displayed to the user from most likely to least likely port-of-entry.

Implementing embodiments as disclosed above may advantageously enable smart searching of a network. For example, the smart search may be able to search for any device across the network based on an identifier (MAC address, IP address, hostname, etc.), returning basic information about the device (all its identifiers, including hostname and addresses), returning all ports that have learned about the device through their forwarding, ARP, or neighbors table, and ordering all ports by how likely each is to be the entry point of the searched device to the network. For each port, each device identifier that was learned and how (whether it was through device inventory, ARP table, neighbors table, forwarding table, LLDP table, etc.) and the MAC address type (whether it was statically or dynamically learned) may be listed. Additionally, the likelihood level, an explanation for the likelihood, the port's LLDP neighbors, and traffic and error metric graphs may also be provided. This search system may provide detailed and pertinent information for any network engineer who wants to learn about a device's connectivity.

The various embodiments of the disclosure discussed above are described in more detail below.

FIG. 1A shows a system (100) in accordance with one or more embodiments of the disclosure. The system (100) includes one or more network devices (103A, 103N) that are connected via a network (101). Each of these components is described below.

In one or more embodiments disclosed herein, the network (101) may be the medium through which the network devices (103A, 103N) are connected. In one embodiment of the disclosure, the network may include other network devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols.

Additionally, in one or more embodiments, a network (e.g., network (101)) may refer to an entire network or any portion thereof (e.g., a logical portion of the devices within a topology of devices). For example, the network (101) may include a datacenter network, a wide area network, a local area network, a wireless network, a cellular phone network, or any other suitable network that facilitates the exchange of information from one part of the network to another. In one or more embodiments, the network (101) may be coupled with or overlap, at least in part, with the Internet.

In one or more embodiments disclosed herein, the one or more network devices (103A, 103N) are physical devices (e.g., the computing system of FIG. 4) that include persistent storage, memory (e.g., random access memory), one or more processor(s) (including a switch chip), and two or more physical ports. Examples of the network devices (103A, 103N) include, but are not limited to, a router, a switch, a top of rack (TOR) switch, and/or a multilayer switch that may be configured as any one of an infrastructure device (e.g., a router, a firewall, a switch, a server, etc.), a core network device, an endpoint, etc. In one or more embodiments, the network devices (103A, 103N) may be directly (or indirectly) connected to one another via the network.

In one or more embodiments, the switch chip is hardware that determines which egress port on a network device (103A, 103N) to forward network information (which may be in the form of media access control (MAC) frames). The switch chip may include egress and ingress ports that may connect to ports on the network device (103A, 103N). Each port may or may not be connected to another device (e.g., a server, a switch, a router, etc.). The network device (103A, 103N) may be configured to communicate with one another via the ports.

Additionally, the persistent storage in the network devices (103A, 103N) may include any type of non-transitory computer readable medium that stores data. For example, the data in the persistent storage may be instructions, which, when executed by one or more processor(s) in the network device (103A, 103N), enable the network device (103A, 103N) to perform all or a portion of the functions configured within the network device (103A, 103N).

In one or more embodiments disclosed herein, the network manager (105) is a physical or virtual device that may be used for performing various embodiments of the disclosure (see e.g., FIGS. 2A-3D). The physical device may correspond to any physical system (e.g., the computing system of FIG. 4) with functionality to implement the various embodiments of the disclosure. For example, the physical device may be, but is not limited to, a server (i.e., a device with at least one or more processor(s), memory, and an operating system) that is directly (or indirectly) connected via the network to the network devices (103A, 103N).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment disclosed herein, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

Additional details of the network manager (105) are discussed below in reference to FIG. 1B.

Figure 1B:
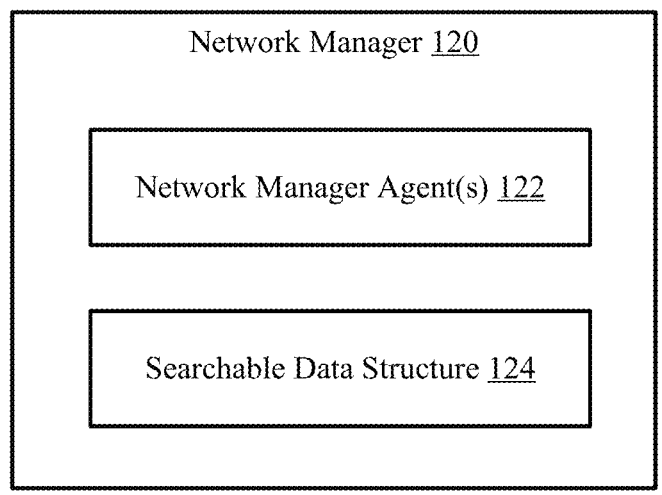
FIG. 1B shows a diagram of an example network manager in accordance with one or more embodiments disclosed herein.

In particular, turning now to FIG. 1B, FIG. 1B shows a network manager (120) in accordance with one or more embodiments of the disclosure. The network manager (120) may be the same as the network manager (105) described above in FIG. 1A. In addition to the components discussed above in reference to FIG. 1A, the network device (120) further includes: one or more network manager agents (122) and a searchable data structure (124). Each of the components illustrated in FIG. 1B is described below.

In one or more embodiments disclosed herein, the network manager agent(s) (122) interact with the other components of the network manager (120). Each network manager agent (122) facilitates the implementation of one or more protocols, services, and/or features of the network manager (120). Examples of network manager agents (120), include, but are not limited to, a bug-alerts agent, a policy agent that manages access control lists, a user interface agent, a routing information base agent, a forwarding information base agent, and a simple network management protocol (SNMP) agent. In one or more embodiments, the one or more embodiments of the network manager agent(s) (122) interact with the other components of the network manager (120) to perform all or a portion of the functions described in accordance with one or more embodiments of the disclosure (see e.g., FIGS. 2A through 3D).

In one or more embodiments disclosed herein, the searchable data structure (124) may be a combination of one or more data structures stored in a storage (e.g., persistent storage (not shown)) of the network manager (120). Each data structure constituting the searchable data structure (124) may be stored in any form (e.g., a list, table, etc.) that can be parsed (i.e., searched) by the network manager agent(s) (122), and may be configured to include any combination of network information associated with any number of network devices (e.g., 103A-103N, FIG. 1A). Additional details of the network information stored in the searchable data structure (124) are discussed below in reference to FIG. 2A.

In one or more embodiments, the network manager agent(s) (122) may be configured to use information from the searchable data structure (124) in providing an endpoint location service. As part of the endpoint location service, the network manager agent(s) (122) may provide search results for media access control (MAC) addresses, internet protocol (IP) addresses, or hostnames of any device on the network. For example, for a network device that is an endpoint device (e.g., a client device and/or a user device such as, but is not limited to, a desktop computer, a laptop computer, a smartphone, a tablet, etc.), the search results may include port locations, ordered from closest to furthest from the endpoint device, of where the endpoint device was found on the network. Additional details of the endpoint location service are discussed below in reference to FIG. 2B.

One skilled in the art will recognize that the architecture of the system (100) and of the network manager (120) is not limited to the components shown in FIGS. 1A and 1B. For example, the system (100) may also include any number of network devices (103A, 103N) that are external to the network (101) (also referred to herein as "external devices" and "external network devices") and connected to one or more of the network devices (103A, 103N) within the network (101). The network (101) may include any number and any type of network devices participating in the sharing of data. Further, the network manager (120) may include components (e.g., a processor, storage, etc.) not shown in FIG. 1B.

Figure 2A:
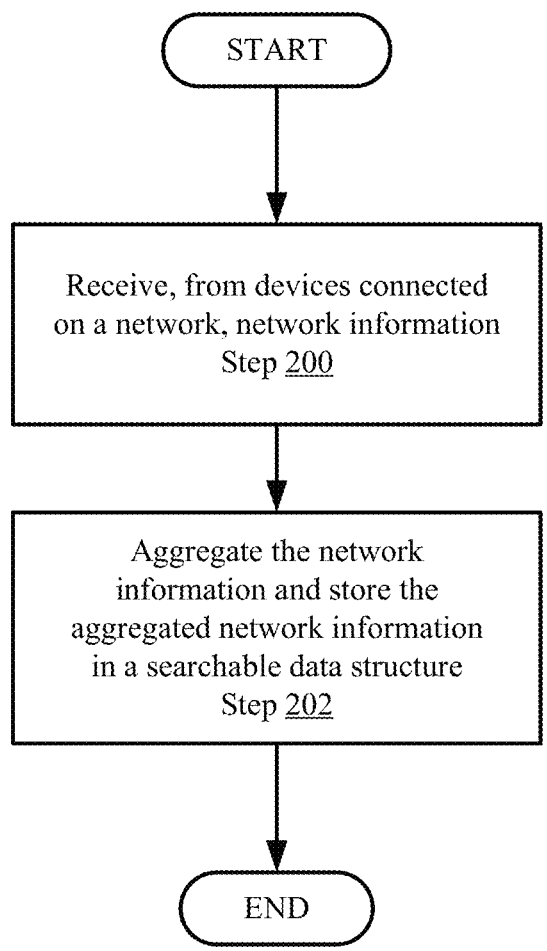
FIG. 2A shows a flowchart in accordance with one or more embodiments described herein.

FIG. 2A shows a flowchart of a method in accordance with one or more embodiments of the disclosure. The method depicted in FIG. 2A may be performed to construct a searchable data structure (e.g., 124, FIG. 1B) of a network manager (e.g., 120, FIG. 1B). The method shown in FIG. 2A may be performed by, for example, a network manager (e.g., 120, FIG. 12). Other components of the systems in FIGS. 1A-1B may perform all, or a portion, of the method of FIG. 2A without departing from the scope of this disclosure.

Additionally, while FIG. 2A is illustrated as a series of steps, any of the steps may be omitted, performed in a different order, additional steps may be included, and/or any or all of the steps may be performed in a parallel and/or partially overlapping manner without departing from the disclosure.

Initially, in Step 200, the network manager received network information from all of the devices (e.g., the network devices (103A, 103N) of FIG. 1A) connected on the network. In one or more embodiments, the network information may be transmitted from each of the devices to the network manager using any form of transmission protocols (e.g., any form of in-band and/or out-of-band techniques). The network information may also be sent from one or more devices to a single device (e.g., a hub device), which then aggregates and forwards all of the received network information to the network manager.

In one or more embodiments, the network information of each device may include, but is not limited to: a set of identifiers, a type (also referred to herein as "device type"), a list of locations, and a status. Each of these components of the network information is discussed in detail below.

In one or more embodiments, each identifier of the set of identifiers may be information that uniquely identifies a device. The identifiers may include, but are not limited to: a MAC address, an internet protocol version 4 (IPv4)/internet protocol version 6 (IPv6) address, a device identification (ID) (e.g., device name and/or serial number) for inventory devices (e.g., devices forming a communication network which other devices may utilize), a primary management IP address, a hostname, etc.

Each identifier may also contain a set of identifier sources. In one or more embodiments, an identifier source is the network protocol or other information source where the identifier was found. An identifier source may be a type of network information management table. For example, if a MAC address of a device was found in a forwarding table (e.g., a MAC forwarding table), then the identifier source would specify the MAC forwarding table (or a filtering database/forwarding database (FDB)) as the source for the MAC address. In one or more embodiments, the identifier sources may include, but are not limited to: FDB (for MAC/forwarding tables) (also referred to herein as "tables forwarding tables"), address resolution protocol (ARP) (for IPv4 address to MAC address conversions) (also referred to herein as "address resolution protocol tables"), neighbor discovery protocol (NDP) (for IPv6 to MAC address conversions) (also referred to herein as "neighbor discovery protocol tables" or simply as "neighbors"), link layer discovery protocol (LLDP) (for devices to discover their neighboring devices) (also referred to herein as "link layer discovery protocol tables"), one or more tables that specify inventories of the devices, etc.

In one or more embodiments, a device may include multiple identifiers. As an example, an inventory device may include a device ID, a hostname, a MAC address, a primary management IP address, and one or more IP addresses. As another example, an endpoint device may include a MAC address and one or more IP addresses. In one or more embodiments, each device may include an identifier list that is configured to store all of the identifiers associated with the device.

In one or more embodiments, the device type may specify the nature of the device. For example, the device type may specify that a device is an endpoint device or an inventory device. The device type may also specify the device as an unknown (i.e., unspecified) device. In one or more embodiments, the status of a device may specify whether a device is active, inactive, or that a status of the device is unknown. The status of the device may be provided via the device inventory.

In one or more embodiments, as discussed above, the network information of each device may include a list of locations. In the context of one or more embodiments disclosed herein, a location in the list of locations is a physical port (or virtual instance thereof) of a device that has discovered at least one of the identifiers for a device. Each location may include a combination including any one of a device ID, a device status, interface name, and a virtual local area network (vlan) ID. The locations may initially be found in the ARP/NDP tables and/or the FDB/MAC tables of any inventory device (active or inactive) on the network.

Each location of the list of locations may advantageously include a timestamp at which the location learned the device identifier of another device. This happens because when a MAC or IP address is propagated across the network, the port (of another device) that learns the address at an earlier point in time is closer to the original device containing the address. The timestamp may be stored in any type of format (e.g., date and time).

In one or more embodiments, each location of the list of locations may also include a mac type specifying how a MAC address of another device has been learned by the device associated with the location (i.e., port). For example, the mac type may specify that the MAC address could be statically configured, dynamically learned, learned via a peer link, etc.

In one or more embodiments, each location of the list of locations may further include likelihood information specifying how likely the location is to be an entry point of a device (e.g., an endpoint device) into the network. The closer a location is to the other device, the higher likelihood the location is the entry point, and vice versa. In one or more embodiments, the likelihood information may be categorized by, but is not limited to: very likely, likely, somewhat likely, and less likely.

In one or more embodiments, each location of the list of locations may further include an explanation list specifying the reasons why the location was assigned a certain category for the likelihood information. In one example of one or more embodiments, a device may either be an endpoint device or an inventory device, and its location can have one of the four categories of likelihood (e.g., very likely, likely, somewhat likely, and less likely). This results in a total of eight possible explanations excluding an unspecified (i.e., unknown) explanation. Using this information, embodiments may provide a method for ranking/scoring/otherwise identifying the relative likelihood of a searched device being present at a location. To do so, the following set of rules may be employed in one or more embodiments:

If the device is an endpoint device:
 (i) If a location finds any identifier of the endpoint device via LLDP (indicating that the location has a direct connection with the endpoint device), then the location may be categorized as VERY_LIKELY as an entry point of the device and includes an explanation of, for example, DIRECT_CONNECTION.
 (ii) If a location finds any other identifiers of another endpoint (e.g., identifiers of multiple endpoint devices) via LLDP (e.g., using information from the LLDP protocol tables), then the location may be categorized as LIKELY and includes an explanation of, for example, NON_INVENTORY_CONNECTION. This location might not have seen a direct connection with an endpoint device but is still able to connect with multiple endpoint devices.
 (iii) If a location has no LLDP connections, then the location may be categorized as SOMEWHAT_LIKELY and includes an explanation of, for example, NO_CONNECTION. These types of locations provide no information about its position relative to an endpoint device.
 (iv) If a location discovers only inventory devices in LLDP, then the location is categorized as LESS_LIKELY and includes an explanation of, for example, INVENTORY_CONNECTION. These types of locations are likely an internal link, which can only connect two internal devices.

If the device is an inventory device:
 (i) If the location is on the inventory device itself and is therefore an original source of the inventory device's own MAC address, then the location is categorized as VERY_LIKELY and includes an explanation of, for example, OWN_PORT_INVENTORY_DEVICE.
 (ii) If a location finds any identifier of the inventory device via LLDP (indicating that the location has a direct connection with the inventory device), the location is categorized as LIKELY and includes an explanation of DIRECT_CONNECTION_INVENTORY_DEVICE.
 (iii) If a location has no LLDP connections, then the location may be categorized as SOMEWHAT_LIKELY and includes an explanation of, for example, NO_CONNECTION_INVENTORY_DEVICE. These types of locations provide no information about its position relative to an inventory device.
 (iv) If a location discovers only other device(s) (inventory or non-inventory) besides the searched inventory device, then the location is categorized as LESS_LIKELY and includes an explanation of, for example, OTHER_CONNECTION_INVENTORY_DEVICE.

In one or more embodiments, each location of the list of locations may further include a list of identifiers that were discovered at the location. For example, if a location was initially found from an ARP table (i.e., a source of the location), matched the IP address "172.20.253.2" to MAC address "00:00:00:00:00:00", and discovered the MAC address using LLDP, such information may be included in the list of identifiers of the location.

In Step 202, the network manager aggregates the received network information in Step 202 and stores the aggregated network information into a storage in the form of a searchable data structure (e.g., 124, FIG. 1B). This searchable data structure will be used for the network manager to execute endpoint location services, as discussed in more detail in reference to below FIG. 2B.

Figure 2B:
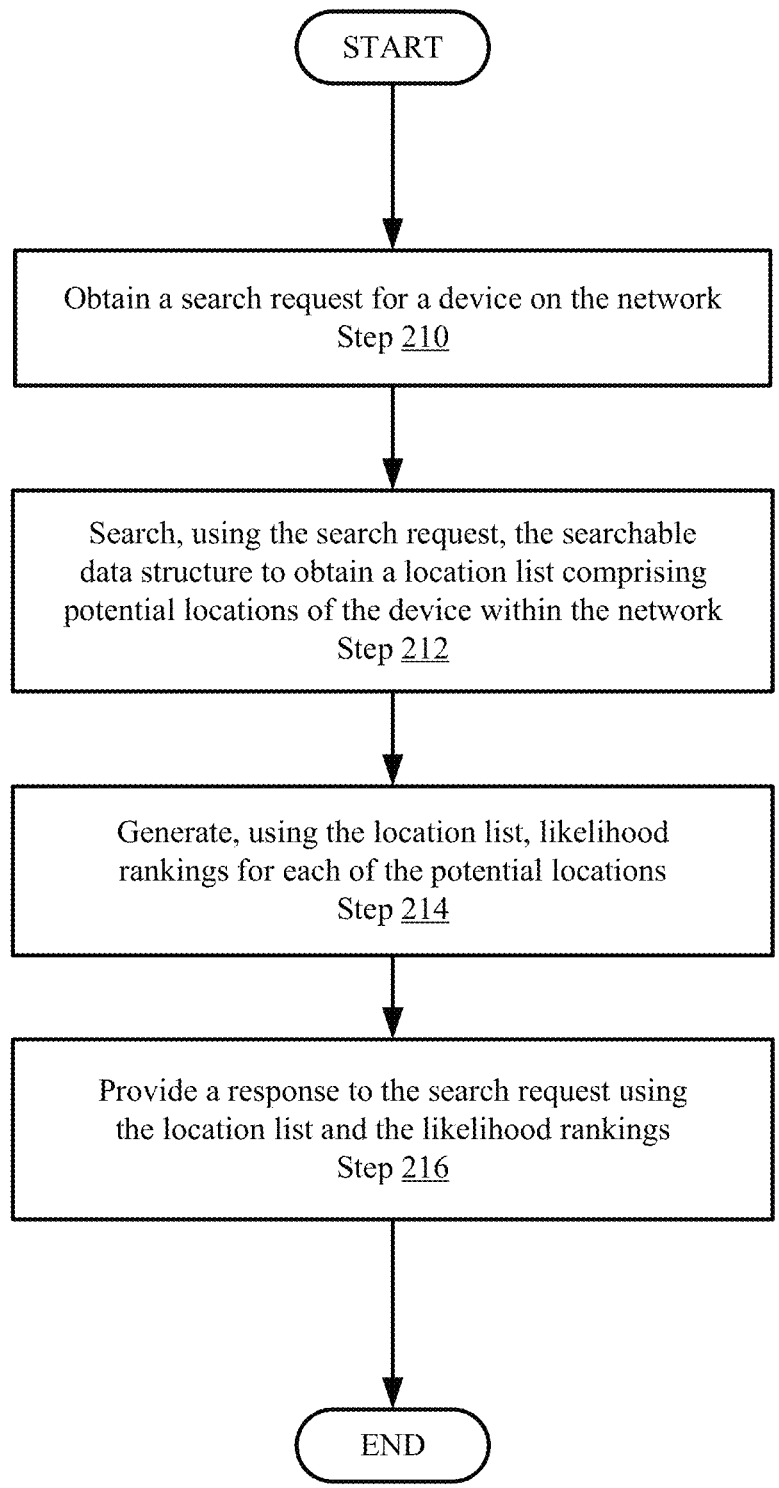
FIG. 2B shows a flowchart in accordance with one or more embodiments.

FIG. 2B shows a flowchart of a method in accordance with one or more embodiments of the disclosure. The method depicted in FIG. 2B may be performed to execute an endpoint location service. The method shown in FIG. 2B may be performed by, for example, a network manager (e.g., 120, FIG. 1B). Other components of the systems in FIGS. 1A-1B may perform all, or a portion, of the method of FIG. 2B without departing from the scope of this disclosure.

Additionally, while FIG. 2B is illustrated as a series of steps, any of the steps may be omitted, performed in a different order, additional steps may be included, and/or any or all of the steps may be performed in a parallel and/or partially overlapping manner without departing from the disclosure.

In Step 210, the network manager obtains a search request for a device on the network. In one or more embodiments, the search request may include a search term. The search term may be a MAC address or an IP address of a device for which the user wishes to locate on the network. The search term may also be a device ID and/or a hostname of an inventory device.

Additionally, embodiments may be implemented using a front-end component and a back-end component. For example, the endpoint location service may be provided as a resource application programming interface (API). On the front-end, a user interface may be implemented in which the user enters an internet protocol (IP) or media access control (MAC) address and gets back a list of results. The results may be categorized by date, so the user can see when the IP or MAC address was learned and get an idea of the history of the address. On the back end, the address resolution protocol (ARP), neighbor discovery protocol (NDP) (also referred to herein as "neighbor"), and MAC tables are all put into an ElasticSearch database for fast queries. In one or more embodiments, the ElasticSearch database may be implemented as a 3-node cluster, one elastic search instance per node. As an example, in each node, the elastic search may be configured to have 2 GB of heap, and 2 CPU cores.

In Step 212, using the search request, the network manager searches (i.e., parses) the searchable data structure to obtain a location list comprising potential locations of the device (i.e., the searched for device) within the network. In one or more embodiments, the network manager may search the searchable data structure for unique identifiers associated with the potential locations. Additionally, the network manager may search through the searchable data structure in the order discussed below. The specific order discussed below is a non-limiting example of one or more embodiments and should not be used to limit the scope of one or more embodiments disclosed herein.

First, the network manager determines whether the search term included in the search request corresponds to an inventory device or an endpoint device in the network. In the event that the search term corresponds to an inventory device, the hostname, device ID, and primary management IP of the inventory device are retrieved. The host name, device ID, and primary management IP of inventory devices may be compiled into a unified list of unique identifiers. In the event the search term corresponds to an endpoint device, the MAC address and IP address(es) of the endpoint device are retrieved and compiled into a unified list of unique identifiers.

Second, when the search term is an IP address or a MAC address, the ARP and NDP tables stored in the searchable data structure are used to find all layer-3 (L3) ports (i.e., locations) that match the search term. Similarly, the forwarding tables stored in the searchable data structure are used to find all layer-2 (L2) ports that match the search term.

Finally, after all the locations are found, the LLDP table is used to determine whether or not each location is directly connected to the searched device.

In one or more embodiments, in addition to the location list, the network manager may also retrieve other information associated with the device such as, but is not limited to: the device status, the identifiers (e.g., hostnames, MAC/IP addresses, etc.) of the device, etc. For example, search results for endpoint devices may include a MAC address identifier and one or more IP address identifiers, while search results for inventory devices may include the device ID, hostname, MAC address, primary management IP address, and one or more IP address identifiers. In one or more embodiments, each location in the list of locations may include at least: a device name, an interface name, a device status, one or more VLANs, a mac type, and a list of LLDP neighbor devices.

In Step 214, the network manager uses the list of locations obtained in Step 212 to generate likelihood rankings for each of the potential locations in the list of locations. Said another way, the network manager may rank the potential locations using the unique identifiers and a set of rules that define the likelihood rankings based, in part, on a source from which the unique identifiers were obtained. For example, in one or more embodiments, each location may also include (e.g., displayed with) a likelihood tag including one of the above discussed likelihood categories, and an explanation specifying why the location is associated with the included likelihood category. In one or more embodiments, when the search results in multiple locations being found, the locations may be ordered by likelihood. In the event that two or more locations have the same likelihood, the two or more locations with the same likelihood will be ordered from an earliest to a latest learned timestamp, with the timestamp information also being included with each learned location. This timestamp information allows a user to identify where on the network the search for device has resided over time. Detailed examples of how locations are displayed are shown below in FIGS. 3C-3D.

In Step 216, the network manager provides a response to the search request. The response by the network manager may include the location list and the likelihood rankings. The response from the network manager may also include the unified list of unique identifiers and instructions for a user device receiving the response to display the response on a display of the user device. Detailed examples of responses (i.e., search request results) being displayed to a user are shown below in FIGS. 3C-3D.

To further clarify embodiments of the disclosure, an example is provided in FIGS. 3A-3D. The numbers in the brackets below, e.g., "[1]", correspond to the same circled numbers in FIGS. 3A-3C.

Start of Working Example

Figure 3A:
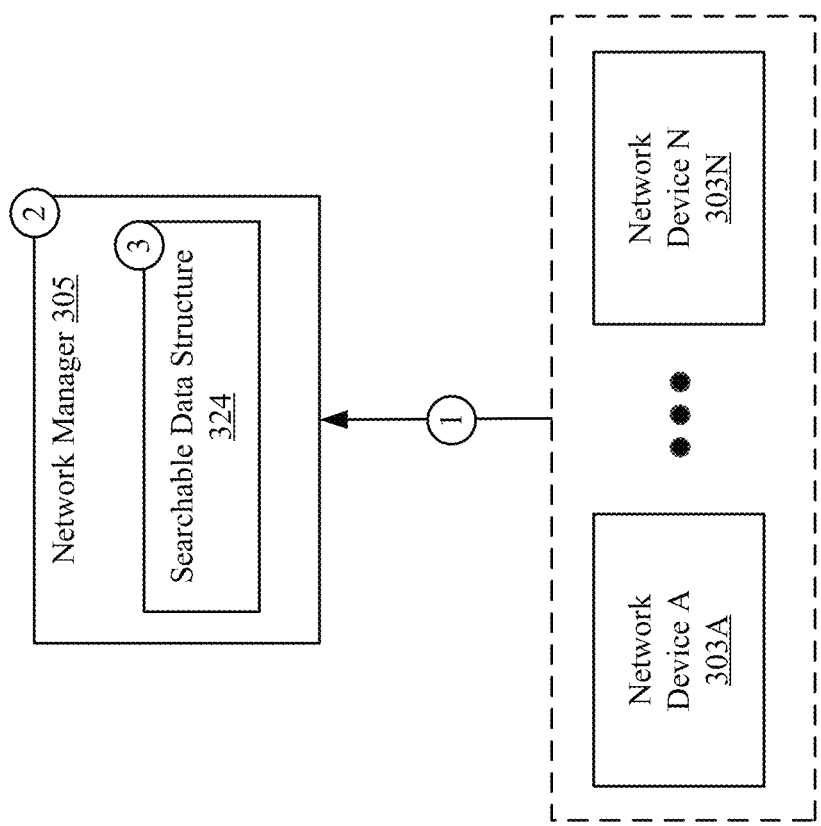

As shown in FIG. 3A, initially, all of the network devices (303A, 303N) transmit network information to the network manager (305) [1]. The network manager receives the network information and aggregates the received network information [2]. The network manager then stores the aggregated network information as a searchable data structure (324) [3].

Figure 3B:
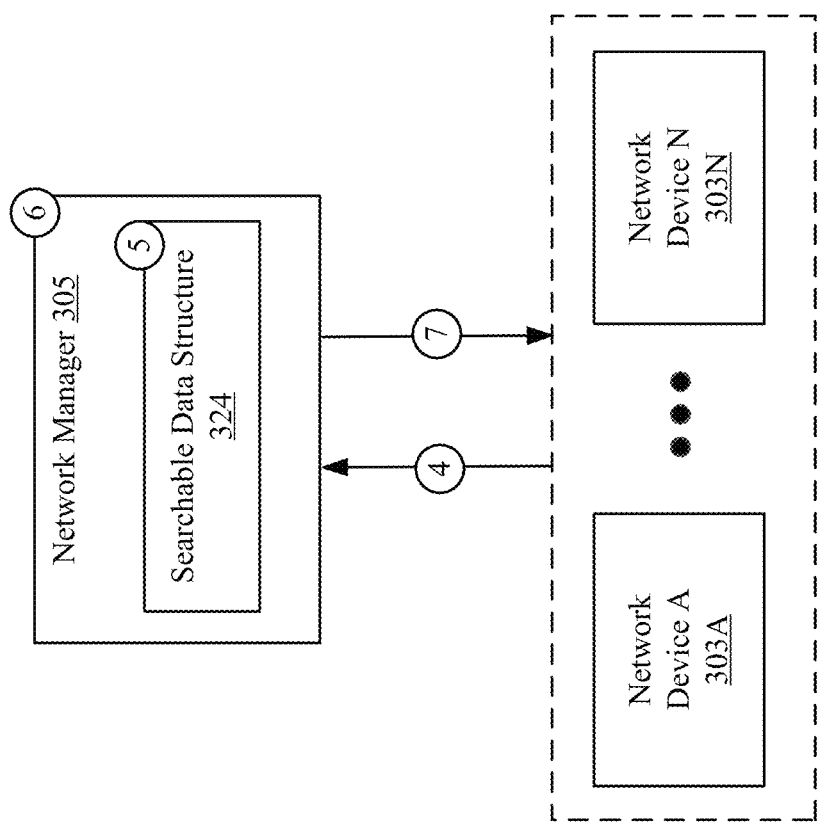

At any point in time after the events discussed in FIG. 3A, as shown in FIG. 3B, a search request is transmitted from one of the network devices (303A, 303N) to the network manager (305) [4]. The network manager receives the search request and parses the search request for a search term [5]. Once the search term is retrieved from the search request, the network manager (305) searches the searchable data structure (324) to obtain a location list comprising potential locations of a device associated with the search term and likelihood rankings for each of the obtained potential locations [6]. The network manager transmits the obtained location list and likelihood rankings back to the device from which the search request originated.

Turning to FIG. 3C, FIG. 3C shows an example of search results displayed to a user via a display of a user device. As shown in FIG. 3C, the search results are for a search request including a MAC address search term 02:0f:02:79:fa:d4. The search results show that the MAC address is associated with an endpoint device that is active and having the MAC address 02:0f:02:79:fa:d4. The search results also show that the endpoint device is somewhat likely connected to a location (shown as "berlin via Port-Channel304"). The location also includes a device status of the device associated with the device (the device with the port), an interface name (bs301.bond0), the VLAN ID (2000), and a mac type (peer dynamic). The information of the location also includes a brief explanation (in the form of a paragraph) of how the likelihood of "somewhat likely" is determined.

Finally, FIG. 3D shows a portion of a search result returning more than one location. As shown in FIG. 3D, a search result using the IP address "10.90.165.1" as a search term returned more than one location. Each location in the returned list of locations is ordered from an earliest (25 days ago) to a latest (6 hours ago) learned timestamp. The top most location of "cvp-sp-16 on port Management 1" is the most likely entry point of an endpoint device into a network.

End of Working Example

Figure 4:
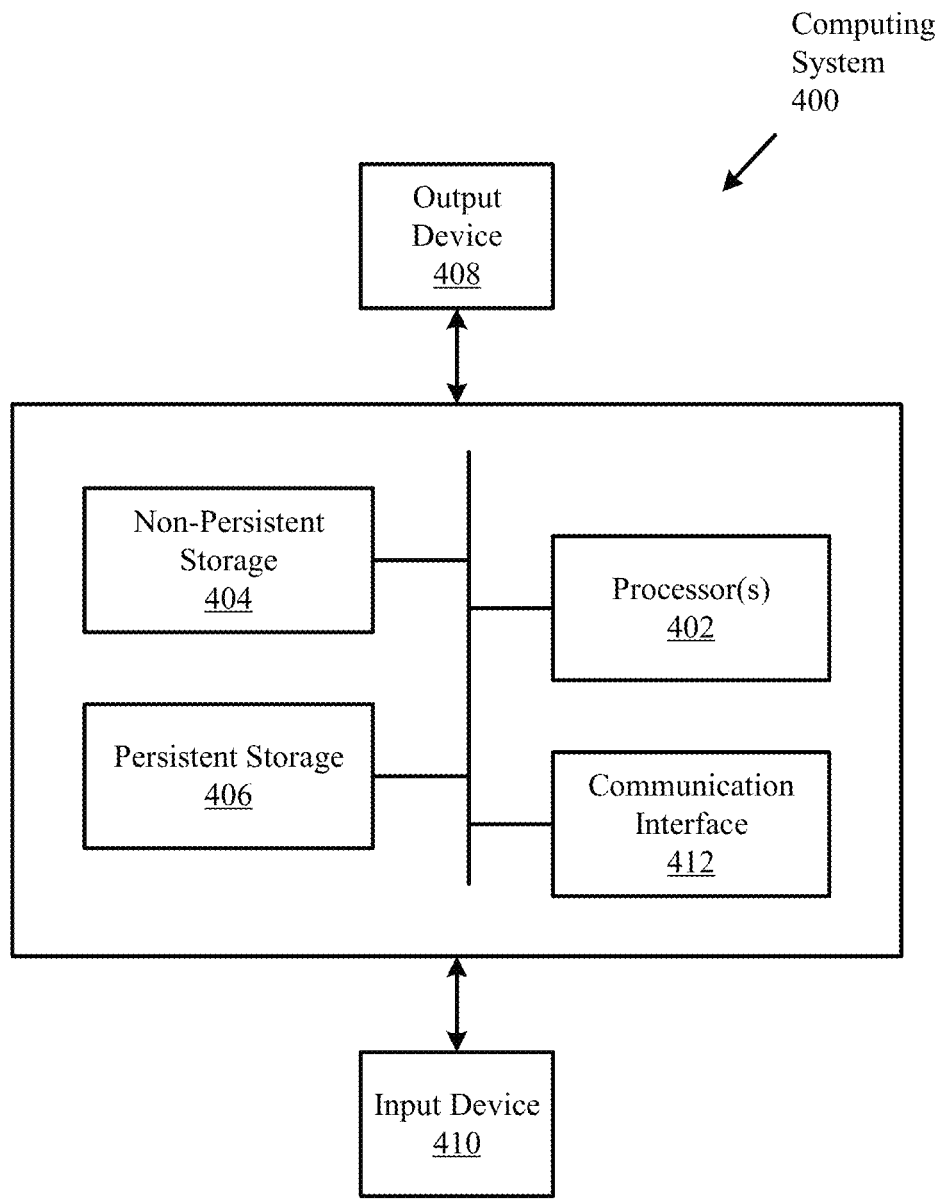
FIG. 4 shows a diagram of a computing device in accordance with one or more embodiments described herein.

As discussed above, embodiments disclosed herein may be implemented using computing devices. FIG. 4 shows a diagram of a computing system in accordance with one or more embodiments disclosed herein. Computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing system (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase connected, or connection, means that there exists between elements/components/devices a direct or indirect connection that allows the elements to interact with one another in some way. For example, the phrase 'connected' may refer to any direct (e.g., wired directly between two devices or components) or indirect (e.g., wired and/or wireless connections between any number of devices or components connecting the connected devices) connection. Thus, any path through which information may travel may be considered a connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A network, comprising:
 a plurality of devices, wherein each device of the plurality of devices is programmed to:
  obtain a respective portion of network information regarding the network in which the device resides, and
  provide network communication services; and
 a network manager programmed to:
  obtain a search request for a device of the plurality of devices specified by a piece of the network information associated with the device, wherein a location of the device in the network is unknown;
  search a searchable data structure using the piece of the network information to obtain a search result, wherein the search result comprises a location list of potential locations within the network where the device may be located;
  generate likelihood rankings of the potential locations; and
  provide a response to the search request using the search result and the likelihood rankings.

2. The network of claim 1, wherein each of the potential locations specify a respective port of one of the plurality of devices.

3. A method of managing a network, comprising:
 obtaining a search request for a device of a plurality of devices of the network, wherein the device is specified by a piece of network information associated with the device and a location of the device in the network is unknown;
 searching a searchable data structure using the piece of the network information to obtain a search result, wherein the search result comprises a location list of potential locations within the network where the device may be located;

obtaining likelihood rankings of the potential locations; and providing a response to the search request using the search result and the likelihood rankings.

4. The method of claim 3, wherein each of the potential locations specify a respective port of one of the plurality of devices and the plurality of devices comprises infrastructure devices and endpoint devices.

5. The method of claim 4, wherein the respective port specifies an identifier of one of the plurality of devices, an interface, and a virtual local area network, wherein each of the potential locations further specifies a mariner in which the respective potential location was learned.

6. The method of claim 4, wherein each of the potential locations further specifies a time at which the respective potential location was learned.

7. The method of claim 6, wherein generating the likelihood rankings of the potential locations comprises:

making a determination that at least two of the likelihood rankings are a same ranking;

in response to the determination, using the time at which the respective potential location was learned to differentiate the at least two of the likelihood rankings.

8. The method of claim 3, wherein the method further comprises:

providing, along with the likelihood rankings, an explanation for the likelihood ranking associated with each of the potential locations.

9. The method of claim 8, wherein the explanation for the likelihood ranking associated with each of the potential locations is based, at least in part, on a type of a network information management table of a plurality of network information management tables in which each respective potential location was found.

10. The method of claim 9, wherein the explanation for the likelihood ranking associated with each of the potential locations is further based, at least in part, on a type of the device, wherein the type of the device is one selected from a group consisting of an infrastructure device and an endpoint device.

11. The method of claim 3, wherein each potential location of the potential locations is associated with a likelihood ranking of the likelihood rankings.

12. The method of claim 11, wherein each likelihood ranking of the likelihood rankings is based, at least in part, on:

a type of the device; and a type of connection of the corresponding potential location.

13. The method of claim 3, wherein the response to the search request comprises a unified list of unique identifiers based on the search result.

14. The method of claim 13, wherein the unified list comprises hostnames and device types associated with the unique identifiers.

15. The method of claim 3, wherein the location list of potential locations comprises information usable to, for a device of the plurality of devices, identify where on the network the device has resided over time.

16. The method of claim 3, further comprising:

prior to obtaining the search request:

obtaining the portions of the network information from the plurality of devices, wherein the portions of the network information comprise a plurality of network information management tables; and populating the searchable data structure using, at least in part, the portions of the network information and a type of each device of the plurality of devices.

17. The method of claim 16, wherein the plurality of network information management tables comprises:

a plurality of tables forwarding tables;

a plurality of address resolution protocol tables;

a plurality of neighbor discovery protocol tables;

a plurality of link layer discovery protocol tables; and a plurality of tables that specify inventories of the devices.

18. The method of claim 3, wherein generating the likelihood rankings of the potential locations comprises:

searching the searchable data structure for identifiers associated with the potential locations; and ranking the potential locations using the identifiers and a set of rules that define the likelihood rankings based, in part, on a source from which the identifiers were obtained.

19. A non-transitory computer readable medium comprising computer readable program code, which when executed by a computer processor enables the computer processor to perform a method for managing a network, the method comprising:

obtaining a search request for a device of a plurality of devices of the network, wherein the device is specified by a piece of network information associated with the device and wherein a location of the device in the network is unknown;

searching a searchable data structure using the piece of the network information to obtain a search result, wherein the search result comprises a location list of potential locations within the network where the device may be located;

obtaining likelihood rankings of the potential locations; and providing a response to the search request using the search result and the likelihood rankings.

20. The non-transitory computer readable medium of claim 19, wherein each of the potential locations specify a respective port of one of the plurality of devices.

* * * * *